(12) United States Patent
Pillers

(10) Patent No.: US 10,691,510 B2
(45) Date of Patent: *Jun. 23, 2020

(54) METHODS AND APPARATUS TO DETECT UNINSTALLATION OF AN ON-DEVICE METER

(71) Applicant: The Nielsen Company (US), LLC, New York, NY (US)

(72) Inventor: Cary Pillers, Richardson, TX (US)

(73) Assignee: The Nielsen Company (US), LLC, New York, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 16/120,119

(22) Filed: Aug. 31, 2018

(65) Prior Publication Data

US 2019/0026166 A1 Jan. 24, 2019

Related U.S. Application Data

(63) Continuation of application No. 15/216,797, filed on Jul. 22, 2016, now Pat. No. 10,089,158, which is a
(Continued)

(51) Int. Cl.
*G06F 9/54* (2006.01)
*G06F 8/61* (2018.01)
(Continued)

(52) U.S. Cl.
CPC ............... *G06F 9/542* (2013.01); *G06F 8/62* (2013.01); *G06F 11/302* (2013.01); *G06F 11/34* (2013.01)

(58) Field of Classification Search
CPC . G06F 8/62; G06F 9/542; G06F 11/34; G06F 11/302
See application file for complete search history.

(56) References Cited

U.S. PATENT DOCUMENTS 5,634,012 A 5/1997 Stefik et al.
6,297,819 B1 10/2001 Furst
(Continued)

OTHER PUBLICATIONS

United States Patent and Trademark Office, "Non-Final Office Action," issued in connection with U.S. Appl. No. 13/249,809, dated Apr. 23, 2013, 25 pages.
(Continued)

*Primary Examiner* — Charles E Anya
(74) *Attorney, Agent, or Firm* — Hanley, Flight & Zimmerman, LLC

(57) ABSTRACT

Example methods and apparatus to detect uninstallation of an on-device meter are disclosed. An example apparatus includes means for detecting that an application is to be uninstalled from the mobile device, the application to gather status information of the means for detecting to ensure that the means for detecting is installed, the application to transmit status information to a data collector. The apparatus includes means for displaying a prompt regarding whether the means for detecting is to be uninstalled when the application is to be uninstalled, the means for displaying to instruct a package manager to remove the means for detecting from the mobile device. The apparatus includes means for communicating an uninstallation notification to the data collector when the application is to be uninstalled, the uninstallation notification to enable identification of a panelist associated with the mobile device.

13 Claims, 10 Drawing Sheets

Related U.S. Application Data continuation of application No. 14/141,402, filed on Dec. 26, 2013, now Pat. No. 9,405,599, which is a continuation of application No. 13/249,809, filed on Sep. 30, 2011, now Pat. No. 8,701,125.

(60) Provisional application No. 61/531,487, filed on Sep. 6, 2011.

(51) Int. Cl.
*G06F 11/30* (2006.01)
*G06F 11/34* (2006.01)

(56) References Cited

U.S. PATENT DOCUMENTS

| | | | |
|---|---|---|---|
| 7,366,908 | B2 | 4/2008 | Tewfik |
| 8,373,538 | B1 | 2/2013 | Hildner et al. |
| 8,701,125 | B2 | 4/2014 | Pillers |
| 2002/0144248 | A1 | 10/2002 | Forbes et al. |
| 2005/0154759 | A1 | 7/2005 | Hofmeister et al. |
| 2006/0048139 | A1 | 3/2006 | Nakumura |
| 2007/0011040 | A1 | 1/2007 | Wright et al. |
| 2008/0005787 | A1 | 1/2008 | Aldred |
| 2009/0187822 | A1 | 7/2009 | Abreu et al. |
| 2009/0292735 | A1 | 11/2009 | Sahasrabudhe |
| 2010/0161506 | A1 | 6/2010 | Bosenick et al. |
| 2010/0248709 | A1 | 9/2010 | Chmaytelli et al. |
| 2011/0006881 | A1 | 1/2011 | Hogaboom et al. |
| 2011/0145920 | A1 | 6/2011 | Mahaffey et al. |
| 2012/0117127 | A1 | 5/2012 | MacDonald |
| 2013/0061218 | A1 | 3/2013 | Moore et al. |

OTHER PUBLICATIONS

United States Patent and Trademark Office, "Notice of Allowance and Fee(s) Due," issued in connection with U.S. Appl. No. 13/249,809, dated Nov. 22, 2013, 17 pages.

United States Patent and Trademark Office, "Non-Final Office Action," issued in connection with U.S. Appl. No. 14/141,402, dated Dec. 26, 2014, 39 pages.

United States Patent and Trademark Office, "Final Office Action," issued in connection with U.S. Appl. No. 14/141,402, dated Jun. 15, 2015, 46 pages.

United States Patent and Trademark Office, "Notice of Allowance and Fee(s) Due" issued in connection with U.S. Appl. No. 14/141,402, dated Mar. 29, 2016, 14 pages.

The State Intellectual Property Office of China, "3rd Notification of Office Action," issued in connectio with Chinese Application No. 201210387629.7, dated Apr. 10, 2017, 6 pages.

United States Patent and Trademark Office, "Notice of Allowance and Fee(s) Due" issued in connection with U.S. Appl. No. 15/216,797, dated May 29, 2018, 18 pages.

State Intellectual Property Office of China, "Notice of of Decision of Granting Patent Right", issued in connection with Chinese patent application No. 201210387629.7, dated Oct. 30, 2017, (5 pages).

Intellectual Property India, "Examination Report" issued in connection with Indian Patent Application No. 2758/DEL/2012 dated Aug. 21, 2018, (8 pages).

State Intellectual Property Office of China, "First Notification of Office Action" issued in connection with Chinese Patent Application No. 201210387629.7, dated Mar. 25, 2016, (10 pages).

State Intellectual Property Office of China, "2nd Notification of Office Action" issued in connection with Chinese Patent Application No. 201210387629.7, dated Oct. 18, 2016, (7 pages).

METHODS AND APPARATUS TO DETECT UNINSTALLATION OF AN ON-DEVICE METER

RELATED APPLICATION

This patent arises from a continuation of U.S. patent application Ser. No. 15/216,797 (now U.S. Pat. No. 10,089,158), which was filed on Jul. 22, 2016, which is a continuation of U.S. patent application Ser. No. 14/141,402 (now U.S. Pat. No. 9,405,599), which was filed on Dec. 26, 2013; which is a continuation of U.S. patent application Ser. No. 13/249,809 (now U.S. Pat. No. 8,701,125), which was filed on Sep. 30, 2011, which is a non-provisional of U.S. Provisional Patent Application Ser. No. 61/531,487, which was filed on Sep. 6, 2011. U.S. patent application Ser. No. 15/216,797 (now U.S. Pat. No. 10,089,158), U.S. patent application Ser. No. 14/141,402 (now U.S. Pat. No. 9,405,599), U.S. patent application Ser. No. 13/249,809 (now U.S. Pat. No. 8,701,125), and U.S. Provisional Patent Application Ser. No. 61/531,487 are hereby incorporated herein by reference in theft entirety.

FIELD OF THE DISCLOSURE

This disclosure relates generally to mobile metering and, more particularly, to methods and apparatus to detect uninstallation of an on-device meter.

BACKGROUND

In recent years, usage of mobile devices and personal computers has become prevalent. Companies such as audience measurement entities seek to monitor mobile device and personal computer usage to, for example, determine usage statistics, media ratings, advertisement exposure, etc. One method of monitoring a mobile device and/or a personal computer includes installing an on-device meter on the computing device. Such an on-device meter monitors activity on the mobile device and/or personal computer and reports the activity to a data collection server for analysis. Typically, the on-device meter is loaded onto the computing device of a person or group of people that have agreed to be monitored. Such persons are referred to herein as "panelists." A panelist may be selected using statistical selection methods to build one or more panels representative of demographic populations of interest (e.g., Hispanic, age 30-35, income of $100,000 per annum, etc.) To join a panel, panelists are typically required to provide their personal demographic information.

DETAILED DESCRIPTION

Figure 1:
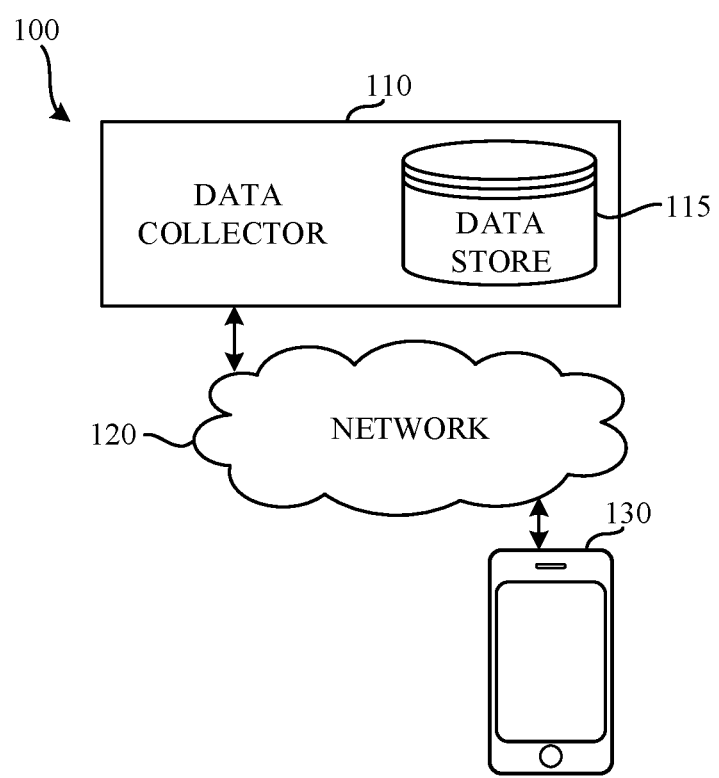
FIG. 1 is a block diagram of an example system constructed in accordance with the teachings of this disclosure for detecting removal (e.g., uninstallation) of an on-device meter from a computing device.

An example method of monitoring a computing device (e.g., a mobile device, a personal computer, etc.) includes installing an on-device meter (ODM) on the computing device. For purposes of this disclosure, it is assumed that the monitored computing device belongs to a panelist, although this is not necessarily true in all applications. In the illustrated example, the ODM monitors activity (e.g., usage) of the computing device and reports the detected activity (e.g., as monitoring information such as usage statistics) to a data collection device (e.g., a server accessible via the Internet). Such monitoring information can be analyzed and/or compiled with monitoring information from other ODMS on other devices of other panelists to provide valuable information to advertisers, content providers, and the like.

In some examples, an entity (e.g., an audience measurement entity) creates a panel of users (e.g., panelists) of computing devices. In some such examples, each panelist agrees to take part in the panel and to have their respective computing device monitored by the monitoring entity. In some examples, the panelists are provided with incentives to participate in the panel. In some examples each computing device is owned by a corresponding panelist or group of panelists (e.g., a family), while in other examples the computing device is provided by the monitoring entity. To monitor a corresponding panelist and/or group of panelists, the ODM is installed on a corresponding computing device. A mobile device such as a mobile phone typically corresponds to a single panelist. However, in some examples, a single mobile device (e.g., an Apple® iPad® or any other tablet) may correspond to multiple users/panelists.

As the monitored device is typically owned by the panelist and/or the monitored device is under the control of the panelist, the panelist may uninstall the ODM. This uninstallation (e.g., removal or deactivation) of the ODM may be intentional such as, for example, when the panelist no longer wishes to have their computing device monitored. Alternatively, the uninstallation may be unintentional such as, for example, when the panelist accidentally uninstalls the ODM (e.g., when conducting maintenance of the monitored device such as virus checking, storage recovery, etc.). In either case, once the ODM is uninstalled, the monitoring entity no longer receives monitoring information from the uninstalled ODM. However, the monitoring entity may not have been notified that the ODM has been uninstalled, and there may be a significant delay (e.g., one month) before the monitoring entity is able to recognize that the ODM has been uninstalled by, for example, determining that monitoring information has not been received and/or by contacting, or being contacted by, the panelist. During that time, the monitoring entity may, for example, provide the panelist with incentives, support, etc.

In some examples, the ODM is not able to communicate with the monitoring entity (e.g., a server of the monitoring entity) during the uninstallation process. For example, on the Android™ mobile operating system, applications are uninstalled by a package manager, and are not able to communicate with other applications and/or servers during the uninstallation process. Example systems, articles of manufacture, and/or methods disclosed herein overcome this problem by informing the monitoring entity when an ODM is uninstalled. Some such examples, include an ODM monitor installed along with the ODM to provide this notification. In some such examples, the ODM monitor detects when the ODM is uninstalled and communicates with the monitoring entity to provide notification of the uninstallation.

The ODM monitor of such examples enables the monitoring entity to detect that a panelist has unenrolled, uninstalled the ODM, uninstalled the ODM monitor, etc. Upon detection of an uninstallation, the monitoring entity can take action to reactivate the panelist (e.g., in the case of an unintentional installation) and/or stop the panelist from accruing incentives, receiving support, etc. In some examples, upon detection of uninstallation of the ODM, the ODM monitor prompts the panelist to determine why the application was uninstalled. In some such examples, the prompt allows the panelist to provide the monitoring entity with feedback to facilitate understanding why the application was uninstalled. Example reasons for uninstallation include the panelist no longer desiring to be a part of the panel, the panelist believing (with or without merit) that the ODM makes their computing device perform poorly, etc. Such feedback allows the monitoring entity to detect issues with the panel earlier than circumstances in which no automatic notification is provided. In some examples, the above mentioned automatic notification of the uninstallation allows the monitoring entity to better manage the panel by, for example, adding more and/or substitute users, providing an update for the ODM, attempting to convince the panelist to continue (e.g., via incentives, etc.)

In some examples, when the ODM is uninstalled, the ODM is not informed by the device (e.g., is unaware) of the uninstallation. Rather, in some examples, a package manager broadcasts a message to all applications other than the ODM notifying the other applications that the ODM is being uninstalled. In some such examples, the ODM is identified by a process identifier that is recognized by the ODM monitor. The ODM monitor thus receives the uninstallation message broadcast by the package manager and takes appropriate action. For example, when the uninstallation event is detected, the ODM monitor of this example sends a notification to a data collection server of the monitoring entity. The notification of this example contains information to identify the panelist, data showing that the ODM has been uninstalled, and the date and time of uninstallation. If for some reason, this notification is not delivered to the data collection server (e.g., loss of network connectivity, failure for the server to acknowledge receipt, etc.), the ODM monitor of this example will retry to send the notification at a later time. Once the notification is successfully transmitted to the data collection server, the ODM monitor of this example presents the user with an exit questionnaire, transmits any results of the exit questionnaire to the data collection server, and then requests that the ODM monitor be uninstalled. The data collection server accepts and parses the results. In the illustrated example, the data collection server updates records stored in a data store to reflect that the panelist has uninstalled the ODM and marks the panelist as unenrolled as of the uninstallation date.

In some examples, the ODM monitor and the ODM are software applications which are packaged together. This co-packaging allows the ODM monitor to be installed without requiring a separate download. In such examples, the panelist is not required to take any action to install the ODM monitor. As long as the ODM is installed on the device, the ODM monitor file also exists, and thus, the ODM monitor can be installed without requiring interaction from the panelist.

FIG. 1 is a block diagram 100 of an example system which is capable of automatically detecting uninstallation of an on-device meter from a computing device 130. The illustrated example of FIG. 1 includes a data collector 110 associated with a monitoring entity such as an audience measurement company, a network 120 such as the Internet, and a monitored computing device 130 associated with one or more panelists. The data collector 110 of the illustrated example includes a data store 115. Although only one collector 110, data store 115, network 120 and computing device 130 is shown in FIG. 1, more than one of any or all of these structures may be present, and/or additional structures, devices, systems, and/or entities may be present.

The data collector 110 of the illustrated example is a server. However, the data collector 110 could be any other type of computing device such as, for example, a personal computer, a laptop, etc. In the illustrated example, the data collector 110 receives monitoring information from the computing device 130.

The data store 115 of the illustrated example may be any tangible device for storing data such as, for example, flash memory, magnetic media, optical media, etc. Furthermore, the data stored in the data store 115 may be in any data format such as, for example, binary data, comma delimited data, tab delimited data, structured query language (SQL) structures, etc. While in the illustrated example the data store 115 is illustrated as a single database, the data store 115 may alternatively be implemented by multiple databases. The data store 115 of the illustrated example stores monitoring information received by the data collector 110 for one or more monitored devices 130 associated with one or more panelists.

The network 120 of the illustrated example is implemented by the Internet. However, any other network or network topology may additionally or alternatively be used such as, for example, a local network, a wireless network, a virtual private network (VPN), etc. In the illustrated example, a single network is shown. However, in some examples, multiple networks 120 are used.

The computing device 130 of the illustrated example of FIG. 1 is shown as a mobile device. However, any type of computing device may additionally or alternatively be used. For example, the computing device may be a personal computer, a personal digital assistant (PDA), a cellular phone, a tablet, a server, etc. In the illustrated example, the computing device 130 transmits monitoring information to the data collector 110.

Figure 2:
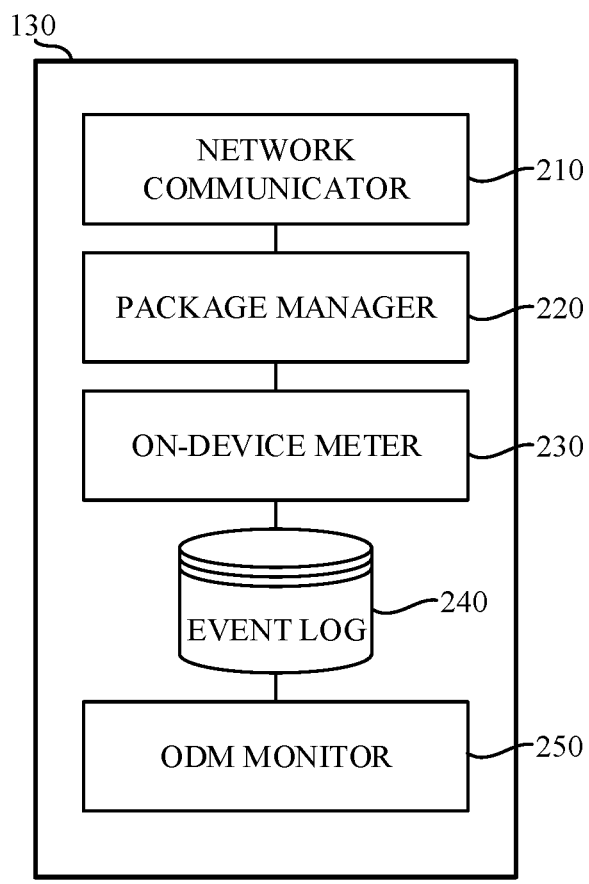
FIG. 2 is a block diagram of the example computing device of FIG. 1 illustrating an on-device meter and an on-device meter monitor constructed in accordance with the teachings of this disclosure.

FIG. 2 is a block diagram of the example computing device 130 of FIG. 1. The example computing device 130 of FIG. 2 includes an on-device meter 230 and an on-device meter monitor 250. The example computing device 130 of the illustrated example of FIG. 2 also includes a network communicator 210, a package manager 220, and an event log 240.

The network communicator 210 of the illustrated example is implemented by a cellular communicator, to allow the computing device 130 to communicate with a cellular network. However, additionally or alternatively, the network communicator 210 may be implemented by any other type of network interface such as, for example, an Ethernet interface, a WiFi interface, a Bluetooth Interface, etc.

The package manager 220 of the illustrated example of FIG. 2 is typically software which is native to the monitored device 130. The package manager 220 manages installation of, updates to, and uninstallation of application(s) and/or application packages on the computing device 130. In the illustrated example, the computing platform of the computing device 130 does not provide a method to alert an application to be uninstalled that it is about to be uninstalled. Rather, when an application is to be uninstalled, the package manager stops the application to be uninstalled and broadcasts a system message alerting applications different from the application being uninstalled of the uninstallation. Further, the package manager 220 of the illustrated example process(es) one installation, uninstallation, or update at a time.

The ODM 230 of the illustrated example of FIG. 2 is software provided to the monitored device 130 by, for example, a monitoring entity when or after, for example, a user of the monitored device 130 agrees to be monitored (e.g., join a panel.) In the example of FIG. 2, the ODM 230 collects monitoring information such as browser interaction, application interaction, device status, user selections, user inputs, URLs, etc. and stores the monitoring information in the event log 240. Periodically and/or aperiodically, the ODM transmits the monitoring information to the data collector 110. In the illustrated example, it is possible for the ODM 230 to modify internal system configurations such as, for example a proxy setting, a VPN setting, etc. In the event of an uninstallation, in the illustrated example these settings are not set back to their default parameters by the package manager. The ODM monitor 250 discussed below, the ODM monitor 250 can set these settings back to their default parameters upon detecting uninstallation of the ODM 230.

The event log 240 of the illustrated example of FIG. 2 is a data structure such as a table or database and may be stored on any tangible medium for storing data such as, for example, flash memory, magnetic media, optical media, etc. Furthermore, the data stored in the event log 240 may be in any data format such as, for example, binary data, comma delimited data, tab delimited data, structured query language (SQL) structures, etc. While in the illustrated example the event log 240 is illustrated as a single structure, the event log 240 may be implemented by multiple data structures such as multiple databases. In the illustrated example, the event log 240 stores monitoring information generated by the ODM 230 until the information is transmitted to the data collector 110. However, any other data may additionally or alternatively be stored in the event log 240.

The ODM monitor 250 of the illustrated example of FIG. 2 is software provided to the monitoring device 130 by, for example, a monitoring entity when or after the user(s) associated with the device 130 agree to be monitored. The ODM monitor 250 of the illustrated example may be compiled as a part of an installation package for the ODM 230 or as a separate installation package. In the illustrated example, the ODM monitor installation package is part of the installation package for the ODM 230. Transmitting the ODM monitor installation package as part of the installation package for the ODM has several benefits such as, for example, (a) the panelist is not required to separately download the ODM monitor 250 from the ODM 230, (b) a version of the ODM monitor 250 is installed with a corresponding version of the ODM 230, (c) the ODM 230 is able to control the installation process of the ODM monitor 250, (d) the ODM 230 can reinstall the ODM monitor 250 if necessary, etc. In some examples, the ODM monitor 250 installation package is transmitted as part of the ODM 230 installation package, but the ODM monitor 250 is not installed as part of the installation process of the ODM 230. The panelist may then, for example, be required to separately install the ODM monitor 250. In such an example, uninstallation of the ODM 230 may not be detected until the ODM monitor 250 is installed.

In the illustrated example, the ODM monitor 250 is installed by the ODM 230 via the package manager 220. In some examples, the package manager 220 informs the panelist of the installation. In such examples, the panelist may then accept or decline the installation of the ODM monitor. Once the ODM monitor 250 is installed, the ODM 230 periodically and/or aperiodically monitors the status of the ODM monitor 250 to ensure that the ODM monitor 250 is installed. In some examples, the usage data transmitted by the ODM 230 to the data collector 110 includes an indication of an installation status of the ODM monitor 250. If the ODM monitor 250 is found to not be installed, installation of the ODM monitor 250 can be initiated by the ODM 230.

Figure 3:
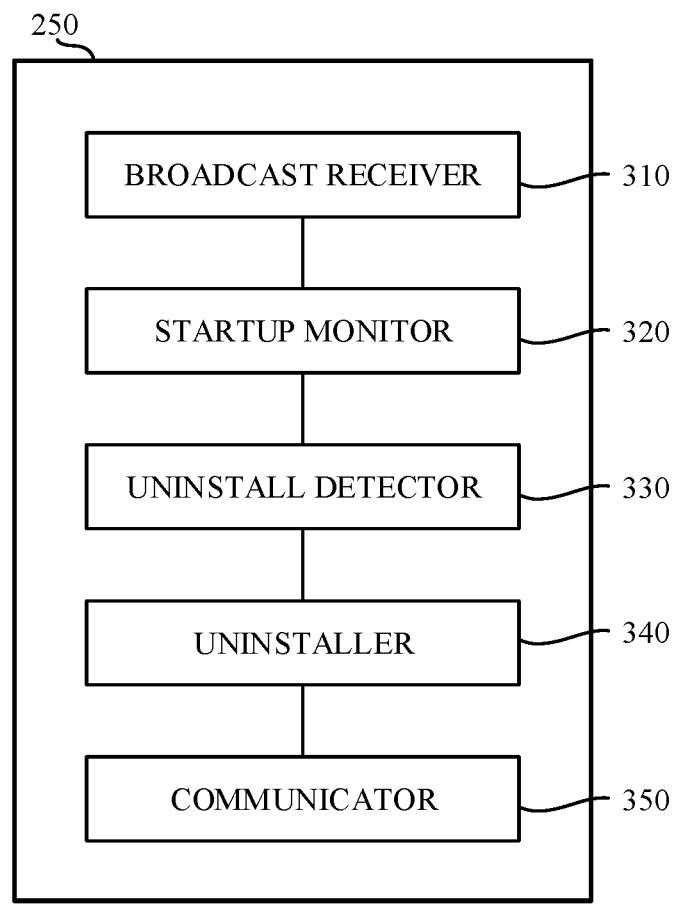
FIG. 3 is a block diagram of the example on-device meter monitor of FIG. 2.

FIG. 3 is a block diagram of the example on-device meter monitor 250 of FIG. 2. The example ODM monitor 250 of FIG. 3 includes a broadcast receiver 310, a startup monitor 320, an uninstall detector 330, an uninstaller 340, and a communicator 350.

The broadcast receiver 310 of the illustrated example receives one or more uninstallation messages from the package manager 220. After uninstallation of the ODM 230 is initiated, the package manager 220 broadcasts an uninstallation message identifying an intent to uninstall the ODM 230. In the illustrated example, the broadcast receiver 310 receives the broadcast message and, notifies the uninstall detector 330 if the message identifies the ODM 230.

The startup monitor 320 of the illustrated example starts the uninstall detector 330 when the computing device 130 is started.

The uninstall detector 330 of the illustrated example is started by the broadcast receiver 310 and/or the startup monitor 320. When the uninstall detector 330 of the illustrated example detects uninstallation of the ODM 230, the uninstall detector 330 takes action to, for example, (a) inform the data collector 110 that the ODM 230 has been uninstalled, (b) prompt the panelist with an exit questionnaire to determine why the ODM 230 was uninstalled, (c) inform the panelist that the ODM monitor 250 will also be uninstalled, (d) send a request to the package manager 220 to uninstall the ODM monitor 250, (e) prompt the panelist for permission to reinstall the ODM 230, (f) reinstall the ODM, etc.

In some examples, upon being started by the startup monitor 320, the uninstall detector 330 determines an installation state of the ODM 230. If the ODM 230 is installed, then the uninstall detector 330 does nothing. In some examples, if the ODM 230 is uninstalled, but an indication of the installation of the uninstallation was not previously sent to the data collector 110 (e.g., as indicated by a status flag accessible to the uninstall detector), the uninstall detector 330 takes action to, for example, inform the data collector 110 that the ODM 230 has been uninstalled, prompt the panelist with an exit questionnaire to determine why the ODM 230 was uninstalled, inform the panelist that the ODM monitor 250 will also be uninstalled, send a request to the package manager 220 to uninstall the ODM monitor 250, etc.

In the illustrated example, the uninstall detector 330 is a foreground service under, for example, the Android operating system. As used herein, a foreground service is a service that may be halted by the operating system, but provide a mechanism to automatically restart the service. As a foreground service, the uninstall detector 330 is allowed to operate on the computing device without interference from the package manager 220. Further, because the uninstall detector 330 of the illustrated example is a foreground service, the uninstall detector 330 may be automatically restarted by the package manager 220 in the event that the uninstall detector 330 is stopped. In other examples, the uninstall detector 330 is a background service. As used herein, a background service is a service that may be halted by the operating system, but does not provide a mechanism to automatically restart the service. As a background service, the uninstall detector 330 is limited in the amount of time that the uninstall detector 330 will be allowed to run. Background services may be closed by the package manager 220 before foreground services.

In the illustrated example, when the ODM 230 is uninstalled, the ODM monitor 250 will also be uninstalled. The uninstaller 340 of the illustrated example prompts the package manager 220 to uninstall the ODM monitor 250 after the action(s) noted above are completed (e.g., the notification).

The communicator 350 of the illustrated example sends messages (e.g., HTTP communications, SIP messages, Short Message Service (SMS) messages, etc.) from the ODM monitor 250 to, for example, the data collector 110. In the event of an uninstallation, the ODM 230 may not be able to transmit the most recently collected monitoring information to the data collector 110 because of, for example, low battery conditions restricting data communication, no available connection, environmental factors, etc. In such examples, the communicator 350 transmits the most recently collected monitoring information to the data collector 110 after uninstallation of the ODM 230. The communicator 350 of the illustrated example communicates via the network communicator 210. In some examples, the communicator 350 is the network communicator 210.

Figure 4:
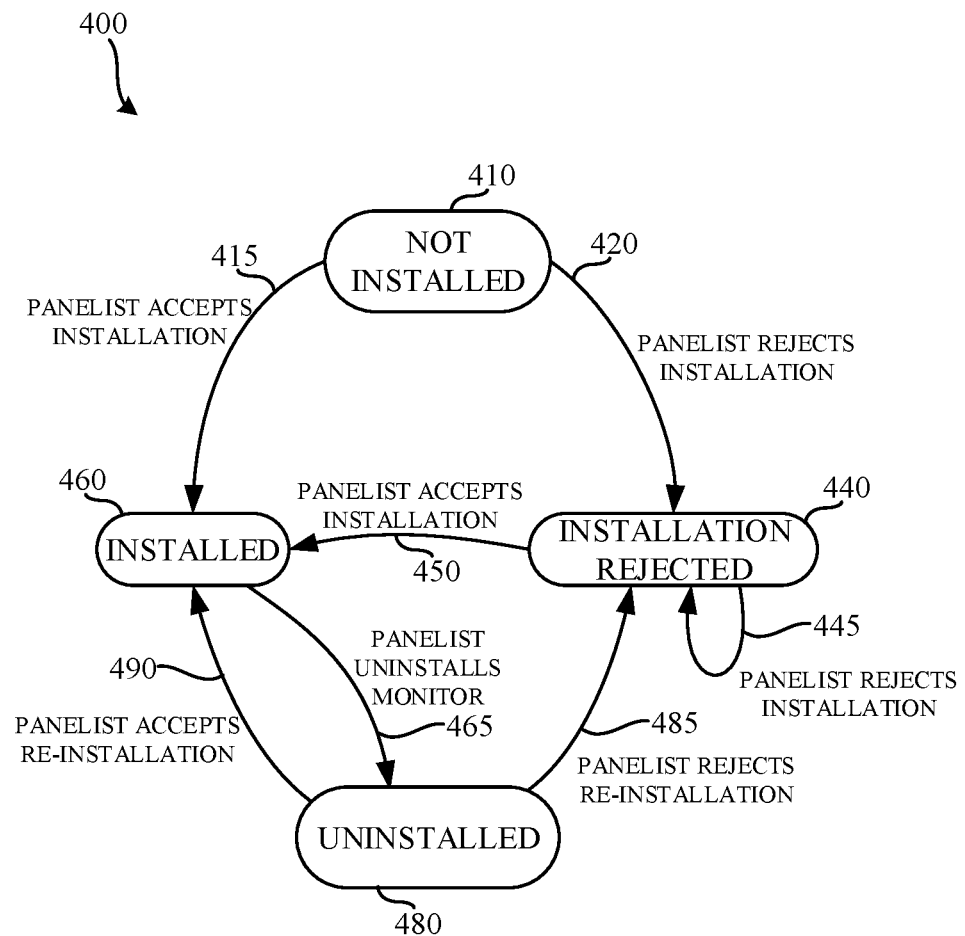
FIG. 4 is a state diagram showing the installation status of the example on-device meter monitor of FIG. 3.

FIG. 4 is an example state diagram 400 showing installation status states of the on-device meter monitor 250 of FIG. 3. The example state diagram 400 of FIG. 4 shows four example states: a first state 410 wherein the ODM monitor 250 is not installed, a second state 440 wherein installation of the ODM monitor 250 has been rejected, a third state 460 wherein the ODM monitor 250 is installed, and a fourth state 480 wherein the ODM monitor 250 was previously installed, but has since been uninstalled.

In the illustrated example, the state diagram reflects the operation of the ODM 230 and the state of the ODM monitor 250. If the ODM monitor 250 is not in the installed state 460, the ODM 230 of the illustrated example initiates an installation procedure to install the ODM monitor 250. If the ODM monitor 250 is in the installed state 460, the ODM 230 of the illustrated example does nothing to change the state of the ODM monitor 250. If the ODM monitor 250 is in the rejected state 440 and/or the uninstalled state 480, the ODM 230 of the illustrated example periodically prompts the panelist to install the ODM monitor 250.

The first state 410, where the ODM monitor 250 is not installed, is the default state. When the device is in the first state 410, the panelist may be prompted to install the ODM monitor 250. If the panelist accepts the installation 415, the state transitions to the third state 460 where the ODM monitor 250 is installed. If the panelist rejects installation of the ODM monitor 250, the state transitions to the second state 440.

In the second state 440, the ODM monitor 250 installation has been rejected. When in the rejected state 440, the ODM 230 of the illustrated example periodically and/or aperiodically prompts the panelist to install the ODM monitor 250. If, when prompted, the panelist rejects the installation 445, the state remains in the rejected state 440. Alternatively, if the panelist accepts the installation 450 of the ODM monitor 250, the device transitions to the installed state 460.

In the third state 460, the ODM monitor 250 is installed. When in the installed state, the ODM 230 takes no action to change the installation state of the ODM monitor 250. If the ODM monitor 250 is uninstalled (intentionally or otherwise) 465 by, for example, the panelist, the state transitions to the uninstalled state 480.

In the fourth state 480, the ODM monitor 250 has been uninstalled (either intentionally or unintentionally). The ODM 230 of the illustrated example prompts the panelist to reinstall the ODM meter 250. If the panelist accepts the installation 490, the ODM meter 250 is installed, and the state transitions to the installed state 460. Alternatively, if the panelist declines the re-installation 485, the state transitions to the rejected state 440.

In some examples, an interface of the ODM 230 displays an installation button that, when activated, installs the ODM monitor 250. In some examples, the installation button is only displayed when the device is in a state other than the installed state 460.

Figure 5:
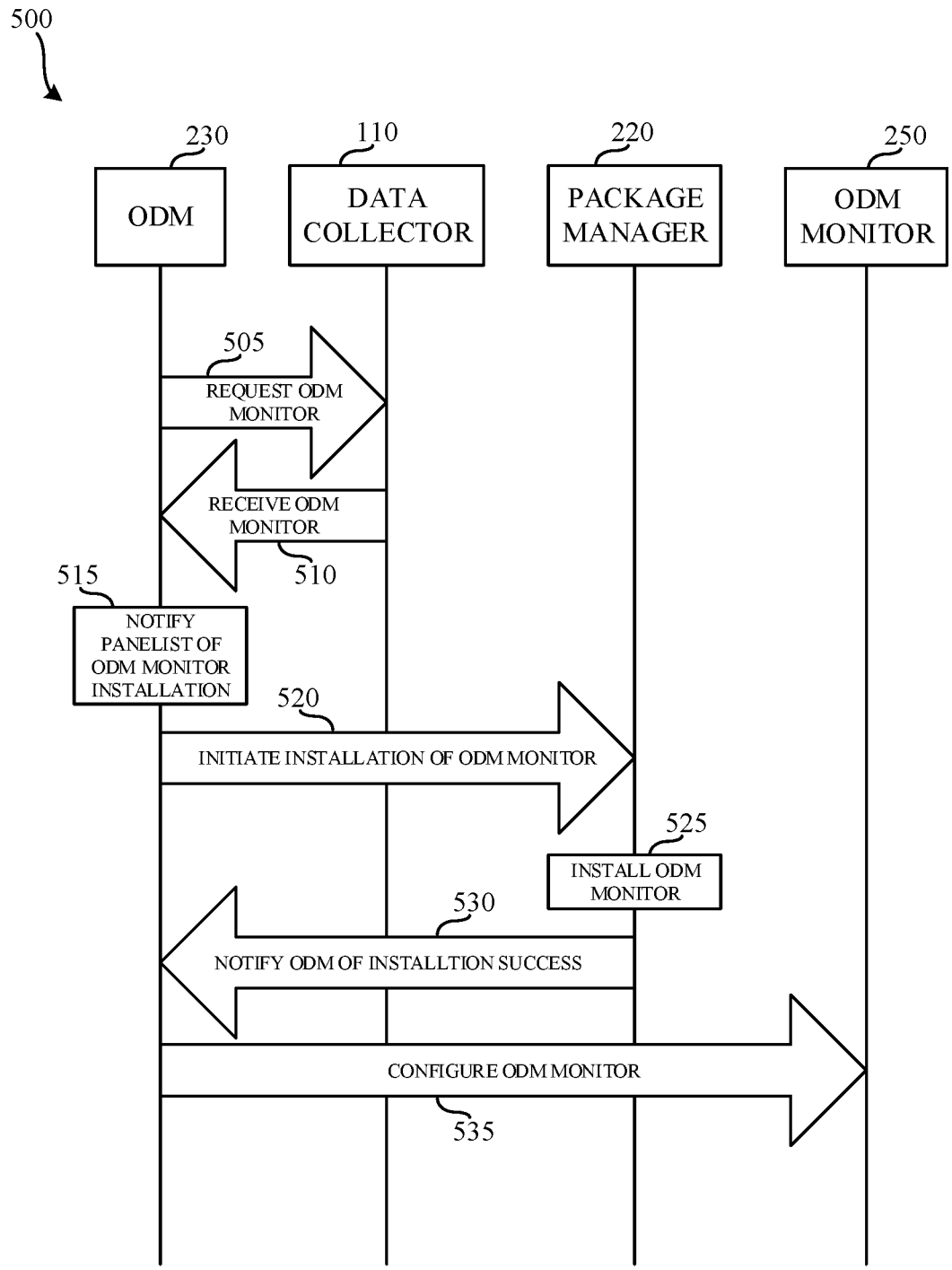
FIG. 5 is an event diagram illustrating an example order of operations for installing the example on-device meter monitor of FIGS. 2 and 3.

FIG. 5 is an event diagram illustrating an example order of operations for installing the example ODM monitor 250 of FIGS. 2 and 3. In the illustrated example, the ODM 230 requests an installation package for the ODM monitor 230 (block 505). In the illustrated example, the ODM 230 requests the installation package from the data collector 110. However, the ODM 230 may request the installation package from any other location such as, for example, an asset management server, a local storage device, etc. The ODM 230 then receives the installation package for the ODM monitor 230 (block 510) and stores the installation package in an accessible location of the computing device 130. In some examples, the installation package of the ODM monitor 250 is not retrieved from a remote location. For example, the installation package of the ODM monitor 250 may have been previously downloaded in conjunction with the ODM 230. In such an example, the installation package of the ODM monitor 250 may be stored on a local storage device of the computing device 130.

The ODM 230 then notifies the panelist of the installation of the ODM monitor 250 (block 515). In some examples, the user is not notified of the installation. In other examples, the panelist is notified and is allowed to accept or reject the installation. In the illustrated example of FIG. 5, the prompt displayed to the panelist is dependent on the current state of the installation of the ODM monitor 250 as described above in conjunction with FIG. 4. For example, in the not-installed state 410, the panelist may be prompted with an OK button to inform the panelist of the installation. When in the uninstalled state 480, the panelist may be prompted with a message informing the panelist of the importance of having the ODM meter installed. In some examples such as, for example, when the ODM monitor 250 requires updating, the ODM 230 may first uninstall the ODM monitor 250, and then install an updated version of the ODM monitor 250. In such an example, the panelist may not be notified of the update.

The ODM 230 next initiates installation of the ODM monitor 250 by sending a message to the package manager 220 (block 520). In the illustrated example, the message is an installation message indicating a location of the installation package. The package manager 220 then installs the ODM monitor 250 via the installation package identified by the ODM 230 (block 525).

The ODM is then notified of the installation (block 530). In the illustrated example, the ODM 230 receives a message from the package manager 220. Additionally or alternatively, the ODM 230 may periodically inspect the installation of the ODM monitor 250 to determine whether the installation is complete. Once the ODM monitor 250 is installed, the ODM 230 configures the ODM monitor 250 (block 535).

Figure 6:
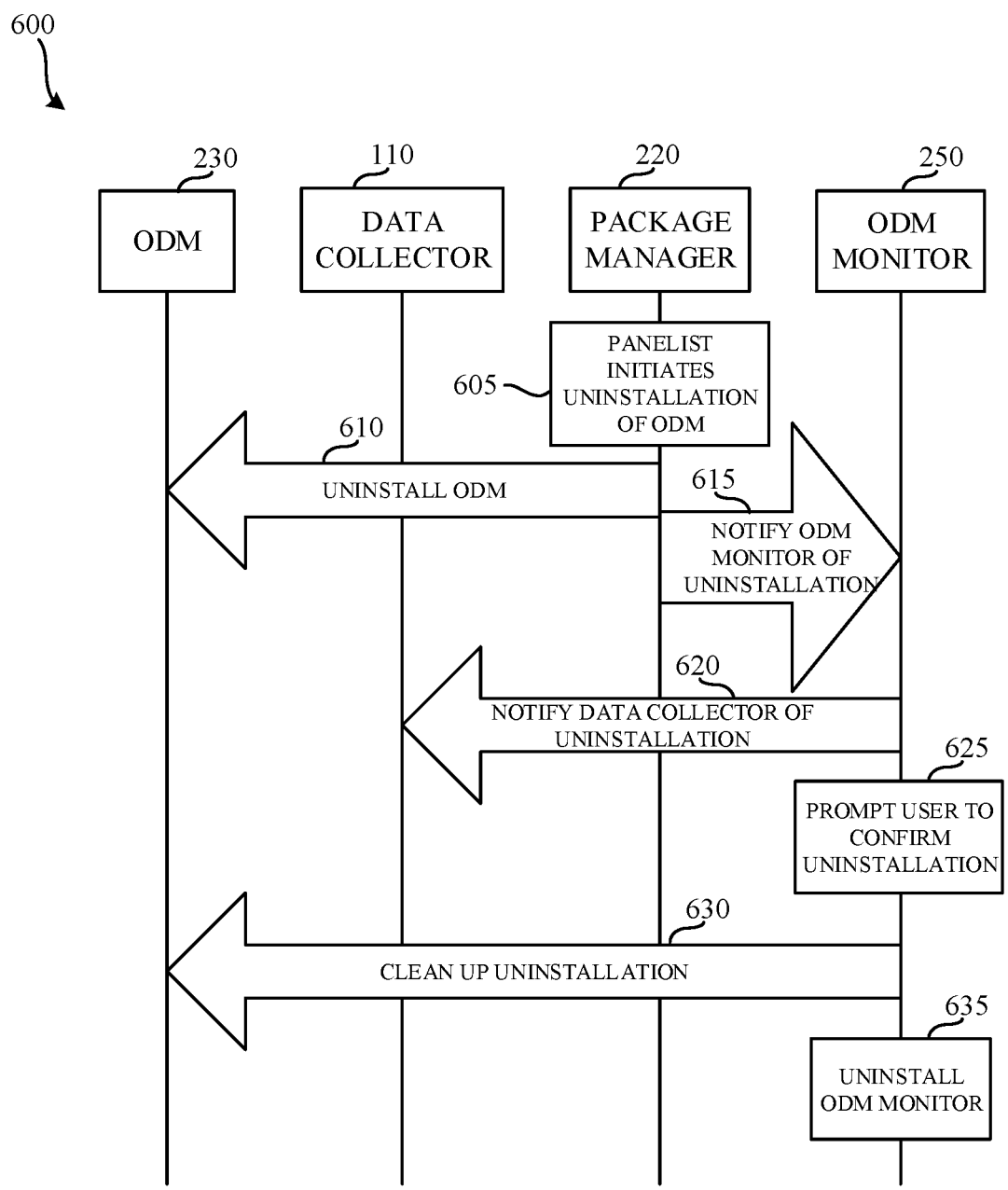
FIG. 6 is an event diagram illustrating an example order of operations for uninstalling the example on-device meter of FIG. 2.

FIG. 6 is an event diagram 600 illustrating an example order of operations for uninstalling the example on-device meter 230 of FIG. 2. The example event diagram 600 begins when the uninstallation of the ODM 230 is initiated via the package manager 220 (block 605). The package manager proceeds to uninstall the ODM 230 (block 610). In the illustrated example, the package manager 220 sends a "sig-kill" message to the ODM 230. The package manager 220 then broadcasts a message alerting other applications, including the ODM monitor 250, of the uninstallation of the ODM 230. The ODM monitor 250 then transmits a message to the data collector 110 informing the data collector 110 of the uninstallation (block 620).

The ODM monitor 250 then prompts the user to confirm uninstallation (block 625). In some examples, the prompt is implemented by triggering a browser of the computing device 130 to display an exit questionnaire to the panelist. The ODM monitor 250 then cleans up the uninstallation of the ODM 230 (block 630). In the illustrated example, cleaning up the uninstallation includes transmitting any remaining log files to the data collector 110. The ODM monitor 250 may then be uninstalled (block 635). In some examples, the ODM monitor 250 may prompt the panelist to confirm uninstallation of the ODM monitor 250. If, for example, the panelist declines uninstallation of the ODM monitor 250, the ODM monitor 250 remains installed and the panelist is not prompted again to remove the ODM monitor 250.

Figure 7:
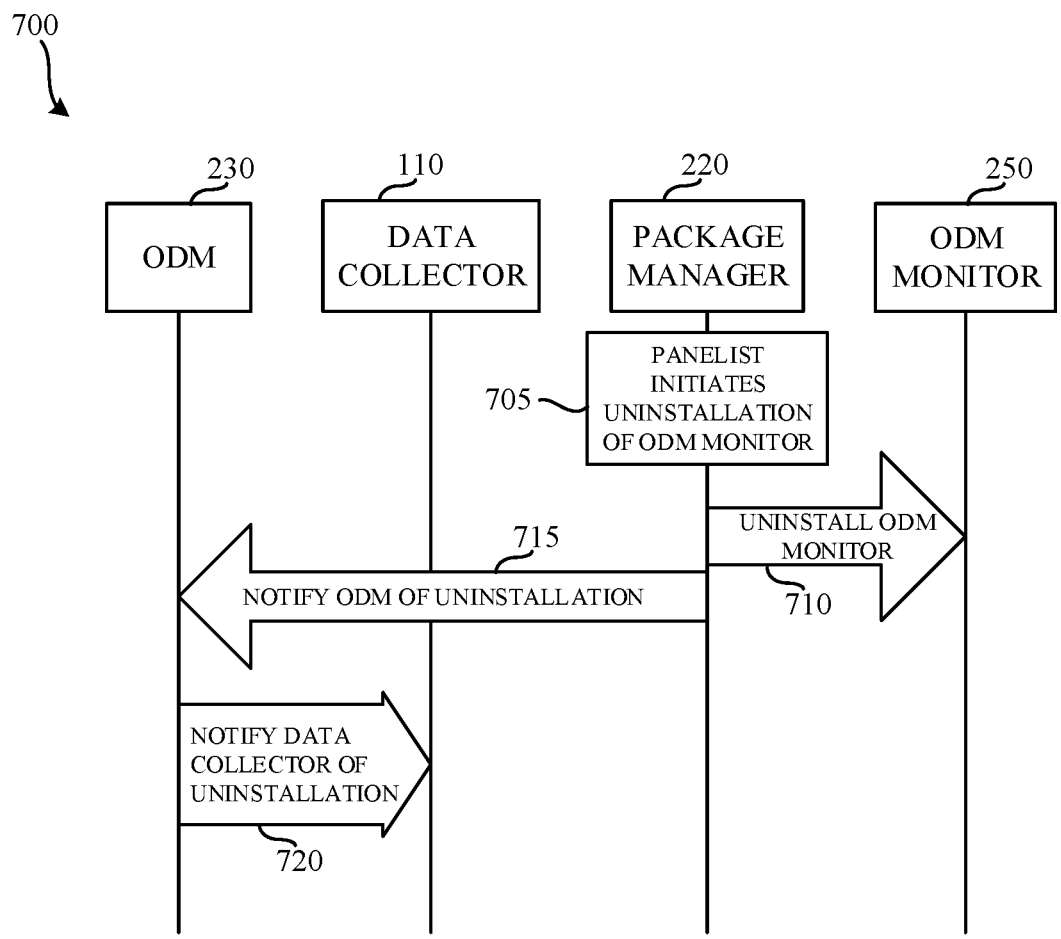
FIG. 7 is an event diagram illustrating an example order of operations for uninstalling the example on-device meter monitor of FIGS. 2 and 3.

FIG. 7 is an event diagram 700 illustrating an example order of operations for uninstalling the example on-device meter monitor 250 of FIGS. 2 and 3. The example event diagram 700 begins when uninstallation of the ODM monitor 250 is initiated via the package manager 220 (block 705). Similar to block 610, the package manager uninstalls the ODM monitor 250 (block 710). The package manager 220 then broadcasts an uninstallation message, thereby informing the ODM of the uninstallation of the ODM monitor 250 (block 715). The ODM 230 of the illustrated example then notifies the data collector of the uninstallation of the ODM monitor 250 (block 720).

Although the example orders of operations 500, 600, and 700 are described in FIGS. 5-7, many other orders of operations may alternatively be used. For example, the order of the blocks of FIGS. 5-7 may be changed, and/or some of the blocks described may be changed, eliminated, or combined.

While an example manner of implementing the ODM of FIG. 2 and/or the ODM monitor 250 of FIGS. 2 and 3 have been illustrated in FIGS. 4-7, one or more of the elements, processes and/or devices illustrated in FIGS. 2 and 3 may be combined, divided, re-arranged, omitted, eliminated and/or implemented in any other way. Further, the example broadcast receiver 310, the example startup monitor 320, the example uninstall detector 330, the example uninstaller 340, the example communicator 350, and/or more generally, the example ODM monitor 250 of FIGS. 2 and 3 and/or the ODM of FIG. 2 may be implemented by hardware, software, firmware and/or any combination of hardware, software and/or firmware. Thus, for example, any of the example broadcast receiver 310, the example startup monitor 320, the example uninstall detector 330, the example uninstaller 340, the example communicator 350, and/or more generally, the example ODM monitor 250 of FIGS. 2 and 3 and/or the ODM of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus of system claims are read to cover a purely software and/or firmware implementation, at least one of the example broadcast receiver 310, the example startup monitor 320, the example uninstall detector 330, the example uninstaller 340, the example communicator 350, and/or more generally, the example ODM monitor 250 of FIGS. 2 and 3 and/or the ODM of FIG. 2 are hereby expressly defined to include a tangible computer-readable medium such as a memory, DVD, CD, etc. storing the software and/or firmware. Further still, the example ODM monitor 250 of FIGS. 2 and 3 may include one or more elements, processes and/or devices in addition to, or instead of, those illustrated in FIG. 4, and/or may include more than one of any or all of the illustrated elements, processes and devices.

Figure 8:
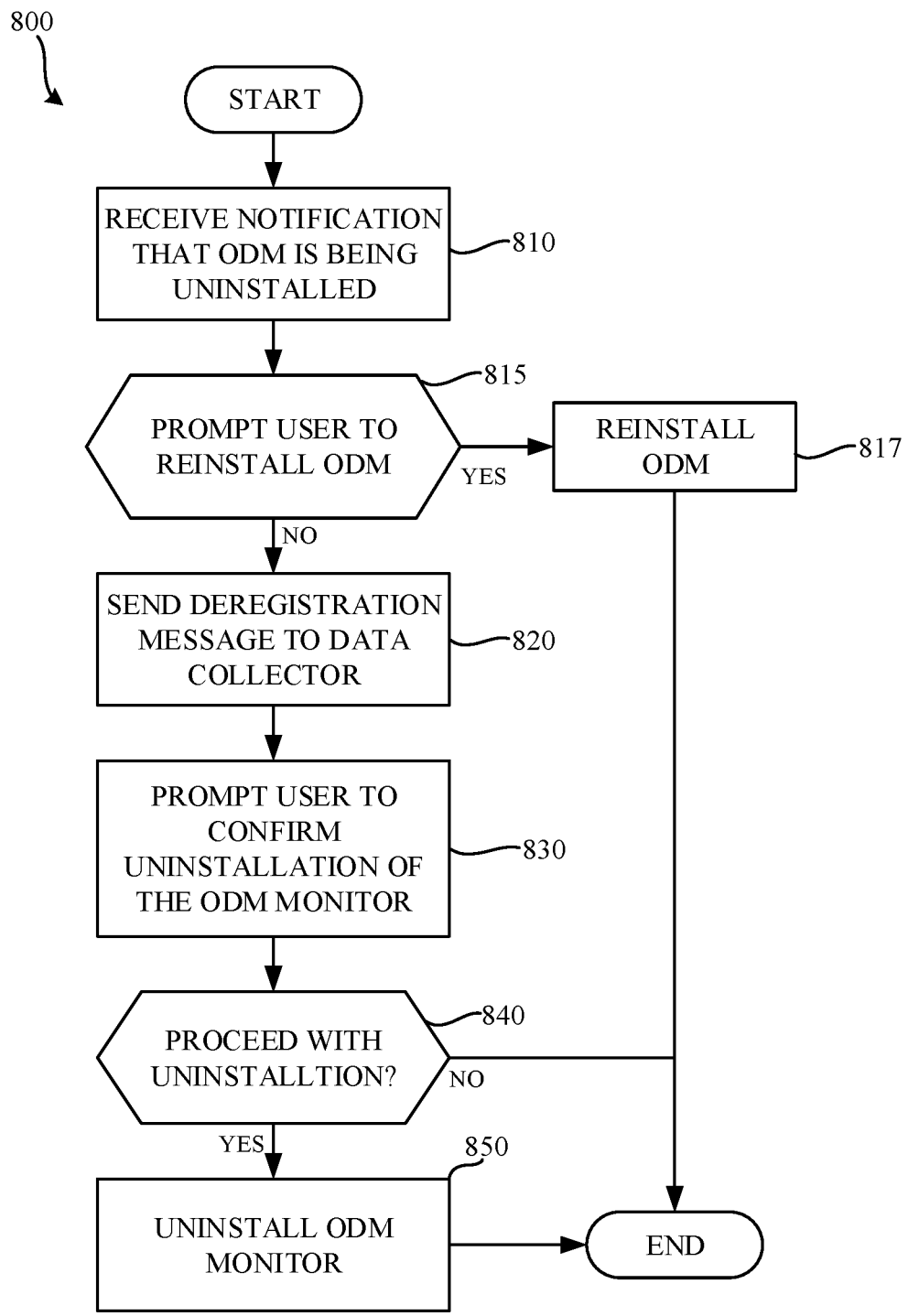
FIG. 8 is a flowchart representative of example machine-readable instructions that may be executed to implement the example on-device meter monitor of FIGS. 2 and 3.
Figure 9:
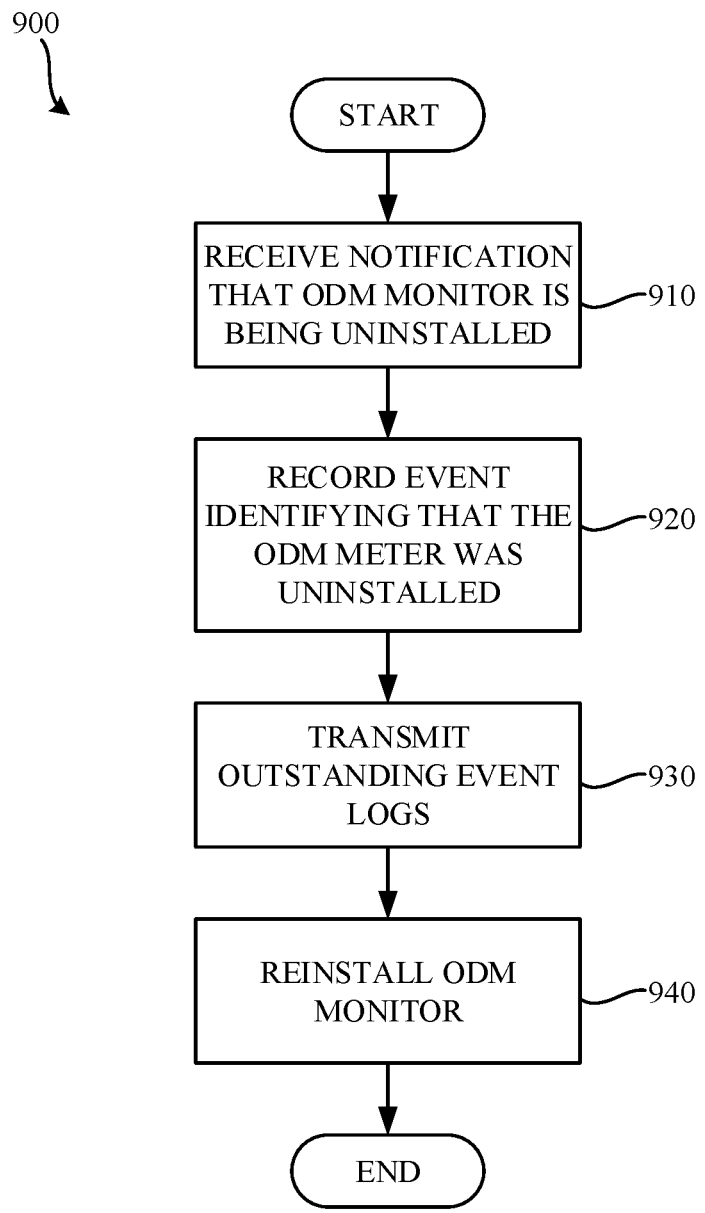
FIG. 9 is a flowchart representative of example machine-readable instructions that may be executed to implement the example on-device meter of FIG. 2.

Flowcharts representative of example machine-readable instructions which may be executed to implement the example ODM 230 of FIG. 2 and/or the example ODM monitor 250 of FIGS. 2 and 3 are shown in FIGS. 8 and 9. In these examples, the machine-readable instructions comprise processes for execution by a processor such as the processor 1012 shown in the example processor platform 1000 discussed below in connection with FIG. 10. The program may be embodied in software stored on a tangible computer-readable medium such as a CD-ROM, a floppy disk, a hard drive, a digital versatile disk (DVD), or a memory associated with the processor 1012, but the entire program and/or parts thereof could alternatively be executed by a device other than the processor 1012 and/or embodied in firmware or dedicated hardware. Further, although the example program is described with reference to the flowcharts illustrated in FIGS. 8 and 9, many other methods of implementing the example ODM 230 of FIG. 2 and/or the example ODM monitor 250 of FIGS. 2 and 3 may alternatively be used. For example, the order of execution of the blocks may be changed, and/or some of the blocks described may be changed, eliminated, or combined.

As mentioned above, the example processes of FIGS. 8 and 9 may be implemented using coded instructions (e.g., computer-readable instructions) stored on a tangible computer-readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals. Additionally or alternatively, the example processes of FIGS. 8 and 9 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals.

FIG. 8 is a flowchart 800 representative of example machine-readable instructions that may be executed to implement the example on-device meter monitor of FIGS. 2 and 3. The process of FIG. 8 begins at block 810 when the broadcast receiver 310 of the ODM monitor 250 receives a notification that the ODM 230 is being uninstalled (block 810). In the illustrated example, the broadcast receiver 310 receives the notification from the package manager 220. However, the broadcast message may originate from any other location. The ODM monitor 250 then prompts the panelist to reinstall the ODM 230 (block 815). In some examples, the uninstallation of the ODM 230 is unintentional. Prompting the panelist to reinstall the ODM 230 creates an opportunity for the ODM 230 to be reinstalled. If the panelist agrees to reinstall the ODM 230, the ODM monitor 250 initiates installation of the ODM 230 (block 817). In some examples, the ODM monitor 250 monitors the package manager 220 to determine when the uninstallation of the ODM 230 is complete before reinstalling the ODM 230. Further, in some examples, the ODM monitor 250 may configure the ODM 230 with settings of the previous installation of the ODM 230.

If the panelist does not agree to reinstall the ODM 230, the communicator 350 transmits any remaining monitoring information stored in the event log 240 to the data collector 110 (block 820). In the illustrated example, because the ODM 230 has been uninstalled, there is no need for the ODM monitor 250 to remain installed. Thus, the uninstall detector 330 prompts the panelist to agree to uninstallation of the ODM monitor 250 by displaying a system alert (block 830). Additionally or alternatively, the prompt may be displayed to the panelist in any other fashion such as, for example, via a browser of the computing device 130, etc. In some examples, the prompt includes an exit questionnaire requesting information on why the ODM 230 is being uninstalled. A response to the prompt is then received by the uninstall detector 330 thereby confirming or rejecting the uninstallation of the ODM monitor 250 (block 840). In examples where the prompt includes the exit questionnaire, information received from the panelist may additionally be transmitted to the data collector 110. If the response confirms the uninstallation, the uninstaller uninstalls the ODM monitor 250 (block 850). Otherwise, the ODM monitor 250 is not uninstalled, and control proceeds to terminate.

FIG. 9 is a flowchart 900 representative of example machine-readable instructions that may be executed to implement the example on-device meter 250 of FIG. 2. The process of FIG. 9 begins at block 905 when the ODM 230 receives a notification that the ODM monitor 250 is being uninstalled. (block 910). In the illustrated example, the notification originates from the package manager 220. However, the notification may originate from any other location. The ODM 230 then records an event in the event log 240 indicating that the ODM monitor 250 has been uninstalled (block 920). In the illustrated example, the ODM 230 transmits events in the event log that have not already been transmitted to the data collector 110 (block 930). Transmitting outstanding event log items enables the monitoring entity, by way of the data collector 110 to identify panelists that have uninstalled the ODM monitor 250. In some examples, the ODM 230 then reinstalls the ODM monitor 250 (block 940).

Figure 10:
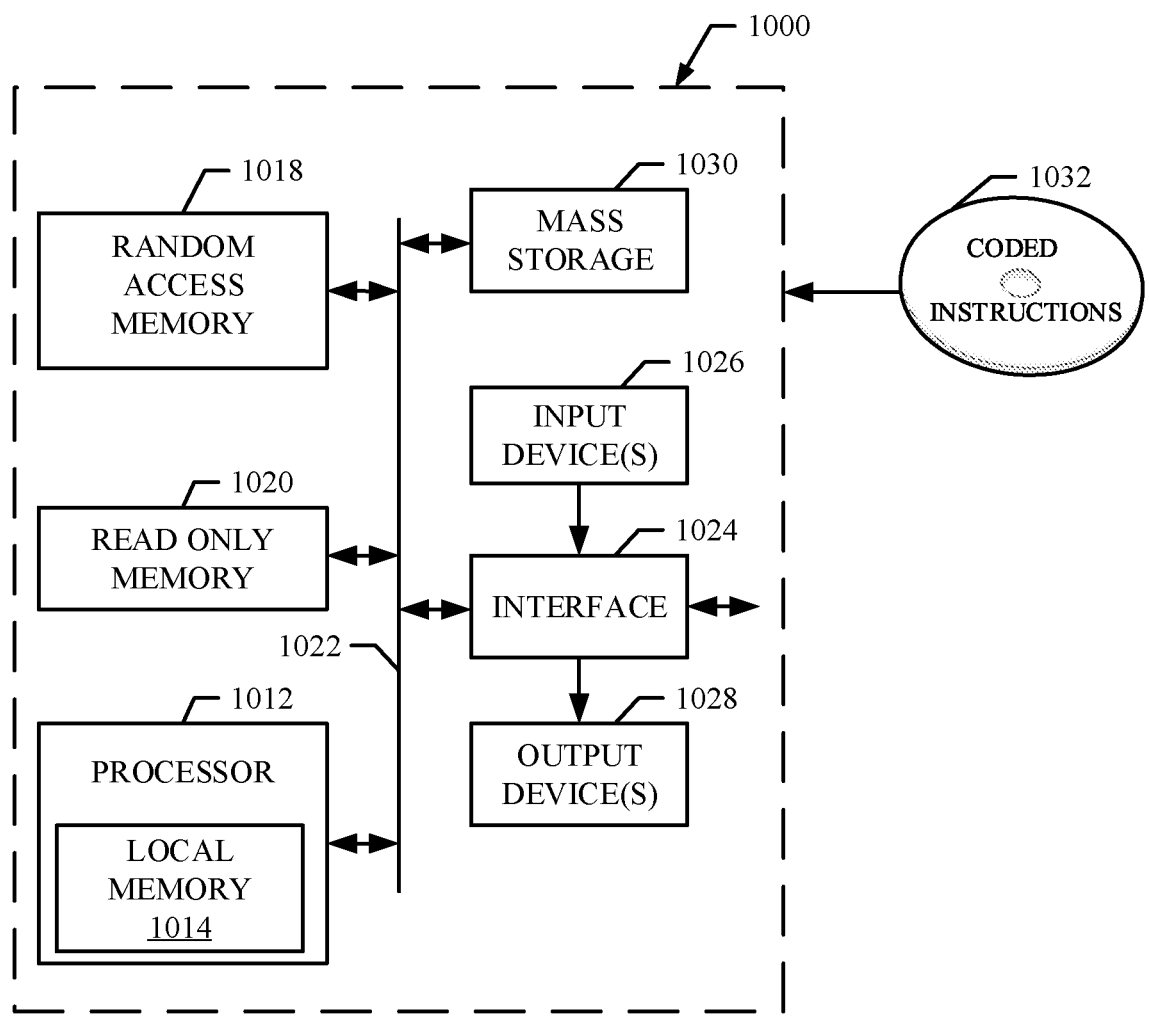
FIG. 10 is a block diagram of an example processor platform that may execute, for example, the machine-readable instructions of FIGS. 8 and/or 9 to implement the example on-device meter of FIG. 2 and/or the example on-device meter monitor of FIGS. 2 and 3.

FIG. 10 is a block diagram of an example processor platform 1000 capable of executing the instructions of FIGS. 8 and/or 9 to implement the example ODM 230 of FIG. 2 and/or the example ODM monitor 250 of FIGS. 2 and 3. The processor platform 1000 can be, for example, a server, a personal computer, a mobile phone (e.g., a cell phone) a personal digital assistant (PDA), an Internet appliance, a digital video recorder, a personal video recorder, a set top box, or any other type of computing device.

The system 1000 of the instant example includes a processor 1012. For example, the processor 1012 can be implemented by any type of processor (e.g., any processor sold by Intel, ARM, etc.) Of course, other processors from other families are also appropriate.

The processor 1012 of the illustrated example is in communication with a main memory 1014 including a volatile memory 1018 and a non-volatile memory 1020 via a bus 1022. The volatile memory 1018 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1014, 1018, and/or 1020 is typically controlled by a memory controller.

The computer 1000 also includes an interface circuit 1024. The interface circuit 1024 may be implemented by any type of interface standard, such as an Ethernet interface, a universal serial bus (USB), and/or a PCI express interface.

One or more input devices 1026 are connected to the interface circuit 1024. The input device(s) 1026 permit a user to enter data and/or commands into the processor 1012. The input device(s) can be implemented by, for example, a keyboard, a mouse, a touchscreen, a track-pad, a trackball, isopoint and/or a voice recognition system.

One or more output devices 1028 are also connected to the interface circuit 1024. The output devices 1028 can be implemented, for example, by display devices (e.g., a liquid crystal display, a cathode ray tube display (CRT), a printer and/or speakers). The interface circuit 1024, thus, typically includes a graphics driver card.

The interface circuit 1024 also includes a communication device (e.g., the network communicator 210, the communicator 350) such as a modem or network interface card to facilitate exchange of data with external computers via a network (e.g., an Ethernet connection, a digital subscriber line (DSL), a telephone line, coaxial cable, a cellular telephone system, etc.).

The processor platform 1000 of FIG. 10 also includes one or more mass storage devices 1030 for storing software and data. Examples of such mass storage devices 1030 include floppy disk drives, hard drive disks, compact disk drives and digital versatile disk (DVD) drives. The mass storage device 1028 may implement the event log 240.

The coded instructions of FIGS. 8 and 9 may be stored in the mass storage device 1030, in the volatile memory 1018, in the non-volatile memory 1020, and/or on a removable storage medium such as a CD or DVD.

From the foregoing, it will be appreciated that the above disclosed methods, apparatus and articles of manufacture enable automatic detection of uninstallation of an on-device meter.

It is noted that this patent claims priority from provisional Patent Application Ser. No. 61/531,487, which was filed on Sep. 6, 2011, and is hereby incorporated by reference in its entirety.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

I claim:

1. An apparatus to detect uninstallation of applications on mobile devices, the apparatus comprising:
   means for detecting that an application is to be uninstalled from the mobile device, wherein the application is to gather status information of the means for detecting to ensure that the means for detecting is installed, wherein the application is to transmit the status information to a data collector;
   means for displaying a prompt indicating whether the means for detecting is to be uninstalled when the application is to be uninstalled, wherein the means for displaying is to instruct a package manager to remove the means for detecting from the mobile device; and
   means for communicating an uninstallation notification to the data collector when the application is to be uninstalled, and wherein the uninstallation notification is to enable identification of a panelist associated with the mobile device.

2. The apparatus of claim 1, wherein the means for detecting is to detect that the application is to be uninstalled in response to a message from the package manager of the mobile device.

3. The apparatus of claim 1, further including a means for startup detection to cause the means for detecting to determine if the application has been uninstalled during startup of the mobile device.

4. The apparatus of claim 1, wherein the application is an on-device meter application.

5. The apparatus of claim 4, wherein the means for detecting is to detect uninstallation of the on-device meter application.

6. The apparatus of claim 5, wherein the means for detecting is specifically dedicated to monitoring the on-device meter application.

7. An apparatus to detect uninstallation of an audience metering application on a mobile device, the apparatus comprising:
   means for detecting that the audience metering application is to be uninstalled from the mobile device based on a notification broadcast within the mobile device, wherein the notification not communicated external to the mobile device, wherein the notification received from a package manager, wherein the audience metering application is to store monitoring information representative of usage of the mobile device;
   means for uninstalling is to instruct a package manager to remove the means for detecting from the mobile device when the audience metering application is uninstalled; and
   means for communicating to:
      transmit the monitoring information to a data collector, the monitoring information stores in an event log by the audience metering application, wherein, the monitoring information not transmitter to the data collector by the audience metering application; and
      transmit an uninstallation notification to the data collector when the audience metering application is to be uninstalled, wherein the uninstallation notification is to enable identification of a panelist associated with the mobile device.

8. The apparatus of claim 7, wherein the means for detecting is to determine if the audience metering application has been uninstalled during startup of the mobile device.

9. The apparatus of claim 7, wherein the means for detecting is dedicated to monitoring only the audience metering application.

10. An apparatus to detect uninstallation of an audience metering process on a mobile device, the apparatus comprising:
   means for detecting that the audience metering process is to be uninstalled from the mobile device based on a notification broadcast within the mobile device, wherein the notification is not communicated external to the mobile device, wherein the audience metering process is to store monitoring information representative of usage of the mobile device;
   means for uninstalling to instruct a package manager to remove the means for detecting from the mobile device when the audience metering process is uninstalled; and
   means for communicating to:
      transmit the monitoring information to a data collector, wherein the monitoring information stored by the audience metering process, and wherein the monitoring information is not transmitted to the data collector by the audience metering process;
      transmit an uninstallation notification to the data collector when the audience metering process is to be uninstalled, wherein the uninstallation notification is to enable identification of a panelist associated with the mobile device;
      in response to transmission of the uninstallation notification to the data collector, cause an exit questionnaire to be presented, wherein the exit questionnaire to request a reason for the uninstallation of the audience metering process; and
      in response to receipt of a response to the exit questionnaire, request uninstallation of the means for detecting.

11. The apparatus of claim 10, wherein the means for detecting is further to determine if the audience metering process has been uninstalled during startup of the mobile device.

12. The apparatus of claim 10, wherein the means for uninstalling is to display, in response to the notification, a prompt asking whether the audience metering process is to be uninstalled, and wherein the means for uninstalling to uninstall the audience metering process in response to a user response to the prompt indicating that the audience metering process is to be uninstalled.

13. The apparatus of claim 10, wherein the means for detecting is dedicated to monitoring only the audience metering process.

\* \* \* \* \*